Feb. 24, 1948.  R. A. BLACK  2,436,542
PIPE JUNCTURE MARKING DEVICE
Filed June 27, 1944
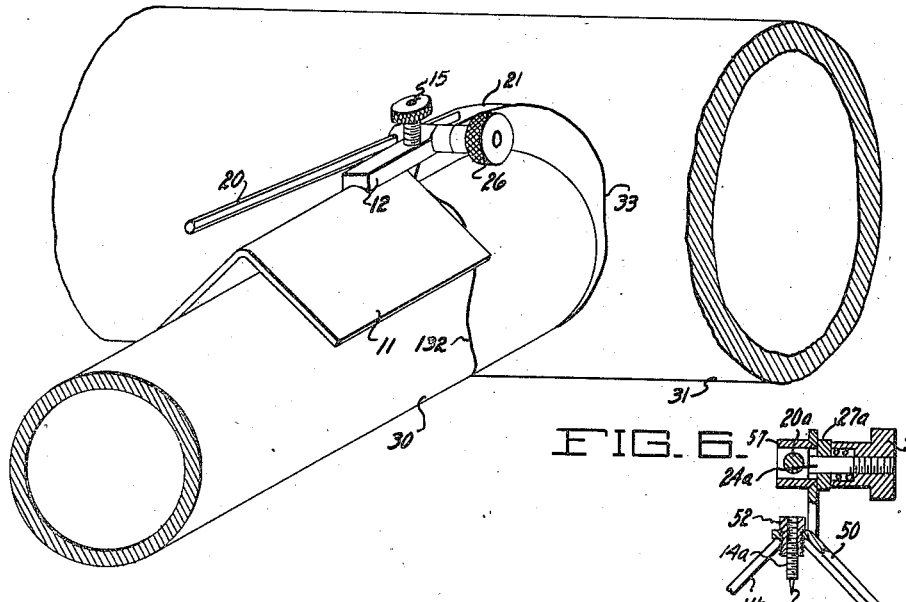
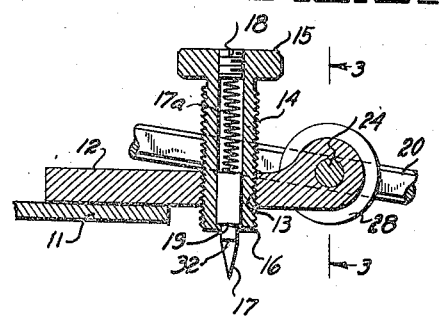
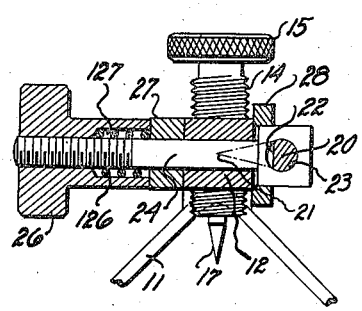
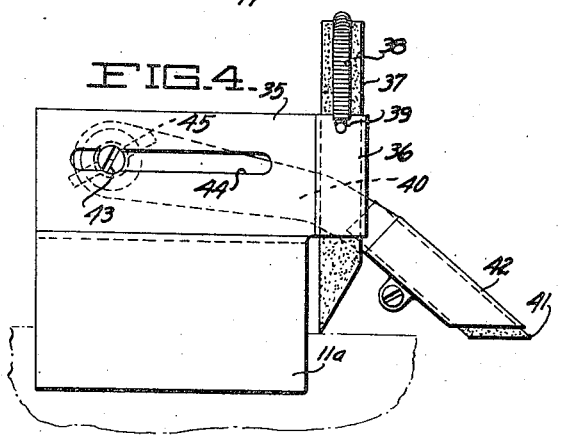
INVENTOR.
RUSSELL A. BLACK
BY
*Fred N. Schwend*
ATTORNEY.

Patented Feb. 24, 1948

2,436,542

UNITED STATES PATENT OFFICE 2,436,542

PIPE JUNCTURE MARKING DEVICE

Russell A. Black, Los Angeles, Calif.

Application June 27, 1944, Serial No. 542,394

7 Claims. (Cl. 33—21)

This invention relates to marking devices, and has particular reference to devices for marking the intersection or juncture lines of a pair of pipes or the like or of a pipe or the like and a body of planar or other shape.

Heretofore, in joining pipes and the like together or in joining a pipe and a non-circular body it was customary to first construct a templet which was formed in accordance with generally known but time consuming rules of development. According to this practice the templet is placed over the pipe or surface to be cut and the cutting line is scribed using the templet as a guide.

In lieu of this procedure devices have been proposed in the past to scribe or cut first the juncture line on one pipe and thereafter to scribe or cut the juncture line on the pipe or surface to which the first pipe is to be joined. These devices, however, require considerable adjustment and manipulation, and are expensive to manufacture.

The principal object of the present invention is to provide a pipe marker or scribing device of simple and compact construction.

A further object is to reduce to a minimum the amount of adjustment required to set a pipe scribing device in condition to scribe the juncture lines on pipes of different sizes.

A further object is to provide a pipe scribing device capable of scribing the juncture lines of a pair of pipes or of a pipe and a surface converging towards each other at any of a large number of possible angles.

A further object is to reduce the amount of manipulation required to operate a scribing device of the above noted type.

A further object is to simultaneously scribe the juncture lines of two pipes or a pipe and a surface to be joined together.

A further object is to provide a pipe scribing device capable of scribing greatly varying diameters of piping.

A further object is to insure proper scribing of rough or irregular surfaced pipes.

The manner in which the above and other objects of the invention are accomplished will be readily understood on reference to the following specification when read in conjunction with the accompanying drawing, wherein:

Fig. 1 is a perspective view of a pipe scribing device embodying the present invention, illustrating the same in operative relation to a pair of pipes.

Fig. 2 is a longitudinal sectional view through the forward end of the scribing device.

Fig. 3 is a transverse sectional view of the scribing device and is taken along the line 3—3 of Fig. 2.

Fig. 4 is a side elevational view of a modified form of the present invention.

Fig. 5 is a front view of the device illustrated in Fig. 4.

Fig. 6 is a transverse sectional view through another modified form of the invention.

Referring to Figs. 1 to 3, inclusive, of the drawing the scribing device comprises a substantially V-shaped base 11 capable of being fitted over various diameters of pipes or the like. Rigidly attached to the apex of base 11 is a bracket 12 having a threaded hole 13 therein. A carrier 14 in the form of a threaded tube having a knob 15 at the upper end thereof is adjustably threaded in the hole 13 and has an inwardly extending annular shoulder at the bottom thereof. A conical scriber or marker 17 is slidably fitted within the carrier and is pressed downward by a compression spring 17a inserted between the scriber and a set screw 18 threaded in the top of the carrier, thus normally holding a shoulder 19 formed on the scriber against the shoulder 16.

It will be noted on reference to Fig. 3 that the axis of the scriber 17 is arranged to bisect the angle formed by the two diverging sides of the base 11 so as to normally lie in a position intersecting the axis of a pipe over which the device is fitted.

A second scriber 20 is also mounted on the bracket 12. This scriber is in the form of an elongated rod having a sharpened end 21 adapted to scribe a cutting line on the pipe or surface to which the pipe encompassed by the base 11 is to be attached. The scriber 20 is generally circular in cross section as shown in Fig. 3 but has a flat portion 22 formed thereon to prevent the scriber from turning on its axis as will appear presently. The scriber is slidably fitted in a transversely extending hole 23 formed in the head of a bolt 24 which, in turn, is slidably fitted in a bearing formed in the bracket 12. The opposite end of bolt 24 is threaded to receive a knurled clamp nut 26, a spacer or washer 27 being preferably interposed between the bracket and the nut 26.

A washer 28 is slidably fitted over the head of bolt 24 and is positioned between the bracket 12 and the scriber 20 so that it normally fits against the flat portion 22 of the scriber, preventing it from turning on its axis. A spring 126 is inserted in a well 127 formed in the nut 26 and yieldably forces the bolt 24 to the left so as to prevent turning of the scriber 20 about its axis even though the nut 26 may be loosened to permit adjustment of the scriber lengthwise or about the axis of bolt 24.

It will be noted from Figs. 1 and 3 that the forward end of the scriber 20 adjacent the point 21 is bent sidewise to position the point 21 in a plane coextensive with the axis of the scriber 17 and with the axis of the pipe over which the device is to be fitted.

In using the device of the present invention, the two pipes or the pipe and other surface to be joined together are first rigidly held in their proper angular relative positions by any suitable clamp device (not shown). They may be separated somewhat from each other or in most cases may directly contact each other without affecting the operation of the device.

Fig. 1 illustrates two pipes 30 and 31 held in rigid relation relative to each other by any suitable means. In preparing the device to scribe the juncture lines of these two pipes the device is positioned with the base 11 fitted over the pipe 30. Thereafter, the knob 15 and carrier 14 may be adjusted to move the scriber 17 into contact with the surface of pipe 30. It is preferable to adjust the carrier 14 somewhat further downward than is necessary to cause the scriber 17 to contact the pipe so that the spring 17a will continually maintain the scriber in contact with the pipe 30 regardless of any irregularity in the periphery thereof. In order to insure proper adjustment of the carrier the edge 32, forming the juncture between the conical and cylindrical portions of the scriber, is arranged somewhat below the bottom edge of the carrier 14. The knob 15 is adjusted downwardly until the scriber 17 contacts the surface of the pipe 30 and the edge 32 is arranged substantially even with the bottom edge of the carrier 14 thus insuring sufficient extra travel of the scriber to follow any irregularity in the pipe.

If the hole to be formed in the pipe 31 is to be of the same diameter as the outside diameter of the pipe 30, the scriber 20 is adjusted to that diameter by loosening the nut 26 and adjusting the scriber until its point 21 lies on a surface co-extensive with the surface of the pipe 30. Thereafter, the nut 26 is tightened to frictionally lock the scriber in its adjusted position. If it is desired to scribe a larger or smaller opening than the outside diameter of the pipe 30 the scriber 20 is adjusted accordingly. The scriber 20 may also be adjusted longitudinally a considerable extent so that in cases wherein two pipes to be marked converge together at a sharp angle the scriber may be extended so that the knob 15 or nut 26 will not strike either of the pipes being scribed during manipulation of the devices.

In order to scribe the juncture lines, the base 11 is held against the pipe 30 and is rotated thereabout while at the same time holding the point 21 of the scriber 20 against the surface of the pipe 31 so as to simultaneously scribe two lines 132 and 33 on the pipes. These lines will therefore form guides to aid in cutting the pipes so that the latter may be joined together.

The point 21 of the scriber 20 may be rounded if desired so as to merely guide the scribing device back and forth along the pipe 31, in which case only the line 132 will be scribed.

It will be noted that by virtue of the V-shaped base 11, it may be fitted over a large number of differently sized pipes and yet accurately align the device relative thereto.

Figs. 4 and 5 illustrate a modified form of the invention in which a V-shaped base 11a is formed having a vertical ledge 35 formed integrally therewith. A rectangular channel 36, integrally attached to the forward edge of ledge 35, forms a vertical guide for a marking tool 37 of soapstone or the like. A tension spring 38 having its ends secured on pins 39 attached to the channel 36 is extended over the top of the tool 37, thereby yieldably pressing the latter downward into contact with the surface of a pipe on which the device may be fitted.

An arm 40 is provided for carrying a second marking tool 41, which latter is rigidly held in a channel 42 formed integrally with the forward end of the arm 40. The rear end of arm 40 is pivoted on a bolt 43 which is slidable along a slot 44 formed in the ledge 35. A wing nut 45 is provided for clamping the arm 40 in any adjusted position along the slot 44 or about the axis of bolt 43.

It will be noted on reference to Fig. 5 that the marking tools 37 and 41 are bevelled in such a way that the points thus formed are substantially in longitudinal alignment with each other.

The operation of the device illustrated in Figs. 4 and 5 is somewhat similar to that of the device illustrated in Figs. 1 to 3. However, since the marking tool 37 is yieldably pressed downward and is capable of considerable travel no adjustment of the latter is necessary, and the only adjustment required is to position the arm 40 so that the marking tool 41 is arranged to scribe the proper diameter circle.

In situations where the two pipes to be joined converge toward each other at a relatively sharp angle the arm 40 may be adjusted along the slot 44 to a position wherein no part of the member 11a or marking tool 37 will interfere with either of the pipes being scribed during manipulation of the device.

Fig. 6 illustrates a modified form of the device illustrated in Figs. 1 to 3, inclusive. In this form a bracket 50 is suitably secured to a V-shaped member 11b similar to member 11. A bolt 24a similar to bolt 24 has the head thereof slidably fitted in a bushing 51 having a conical end fitted into a conical bearing formed in the bracket 50. A scriber 20a, similar to scriber 20, but entirely circular in cross section and having its scribing point coextensive with the axis of the scriber, is fitted in coextensive openings formed in the head of the bolt 24 and in the bushing 51. The scriber is locked in any adjusted position by a clamp nut 26b, there being a washer 27a interposed between nut 26b and the bracket 50.

A scriber 17b is slidably carried in a carrier 14a in a manner similar to the scriber 17. However, the carrier 14a is threaded throughout its length and is threaded within a bushing 52 which, in turn, is threaded in a threaded hole formed in an extension of the bracket 50. In view of the telescoping parts 14a and 52 the heighth of the same may be restricted while permitting substantially the same amount of adjustment of the carrier 14a as that possible with the carrier 14. It will be noted that the axis of scriber 20a is intersected by the axis of scriber 17a which, in turn, bisects the angle formed by the sides of the member 11b.

Having thus described the invention, what I claim as new, and desire to secure by Letters Patent is:

1. A device for scribing the juncture line of a pipe or the like cylindrical element of any of various diameters and a body to be joined thereto comprising a member having means thereon adapted to guide said member about said element, a scriber carried by said member for scribing a line on said element, and means controlled by the surface of said body for guiding said member longitudinally of said element during movement thereof about said element.

2. A device for scribing the juncture lines of a pipe or the like cylindrical element of any of various diameters and a body to be joined thereto comprising a member having means thereon adapted to guide said member about said element, a scriber carried by said member for scribing a line on said element, and a second scriber carried by said member for scribing a line on said body and for guiding said member during movement thereof about said element whereby to cause said scribers to scribe said juncture lines on said element and on said body.

3. A device for scribing the juncture line of a pipe or the like cylindrical element of any of various diameters and a body to be joined thereto comprising a member having means thereon adapted to guide said member about said element, a scriber for scribing a line on said element, means supporting said scriber on said member, said last mentioned means including a device whereby said scriber may be manually adjusted toward and away from said element; and means on said member for guiding the same along the surface of said body during movement of said member about said element whereby to cause said scriber to scribe said juncture line on said element.

4. A device for scribing the juncture lines of a pipe or the like cylindrical element of any of various diameters and a body to be joined thereto comprising a member having means thereon adapted to guide said member about said element, a scriber for scribing a line on said element, means supporting said scriber on said member, said last mentioned means including a device whereby said scriber may be manually adjusted toward and away from said element a second scriber for scribing a line on said body and for guiding said member along the surface of said body during movement of said member about said element whereby to cause said scribers to scribe said juncture lines on said element and on said body, and means on said member supporting said second scriber, said last mentioned means including a device whereby said second scriber may be manually adjusted toward and away from said body.

5. A device for scribing the juncture line of a pipe or the like cylindrical element of any of various diameters and a body to be joined thereto comprising a member having means thereon adapted to guide said member about said element, a scriber carried by said member for scribing a line on said element, spring means for pressing said scriber against said element, and means on said member for guiding the same along the surface of said body during movement of said member about said element whereby to cause said scriber to scribe said juncture line on said element.

6. A device for scribing the juncture lines of a pipe or cylindrical element and a body to be joined thereto comprising a substantially V-shaped member adapted to be fitted over said element, a scriber carried by said member for scribing a line on said element, spring means for pressing said scriber against said element, a second elongated scriber for scribing a line on said body and for guiding said member along the surface of said body during movement of said member about said element whereby to cause said scribers to scribe said juncture lines on said element and on said body, and means on said member supporting said second scriber for lengthwise adjustment and for adjustment about an axis extending transversely of the length thereof.

7. A device for scribing the juncture lines of a pipe or cylindrical element and a body to be joined thereto comprising a member having inclined contact surfaces adapted to be fitted over said element, a scriber carried by said member for scribing a line on said element, spring means for pressing said scriber against said element, a second elongated scriber for scribing a line on said body and for guiding said member along the surface of said body during movement of said member about said element whereby to cause said scribers to scribe said juncture lines on said element and on said body, and means on said member supporting said second scriber for lengthwise adjustment and for adjustment about an axis extending transversely of the length thereof.

RUSSELL A. BLACK.

REFERENCES CITED

The following references are of record in the file of this patent:

UNITED STATES PATENTS

| Number | Name | Date |
| --- | --- | --- |
| 776,713 | Wurts | Dec. 6, 1904 |

FOREIGN PATENTS

| Number | Country | Date |
| --- | --- | --- |
| 561,946 | Germany | 1932 |

OTHER REFERENCES

American Machinist, Feb. 14, 1946.